Aug. 21, 1962   P. J. MOORE   3,050,449
HYDROCARBON SAMPLING
Filed June 3, 1959
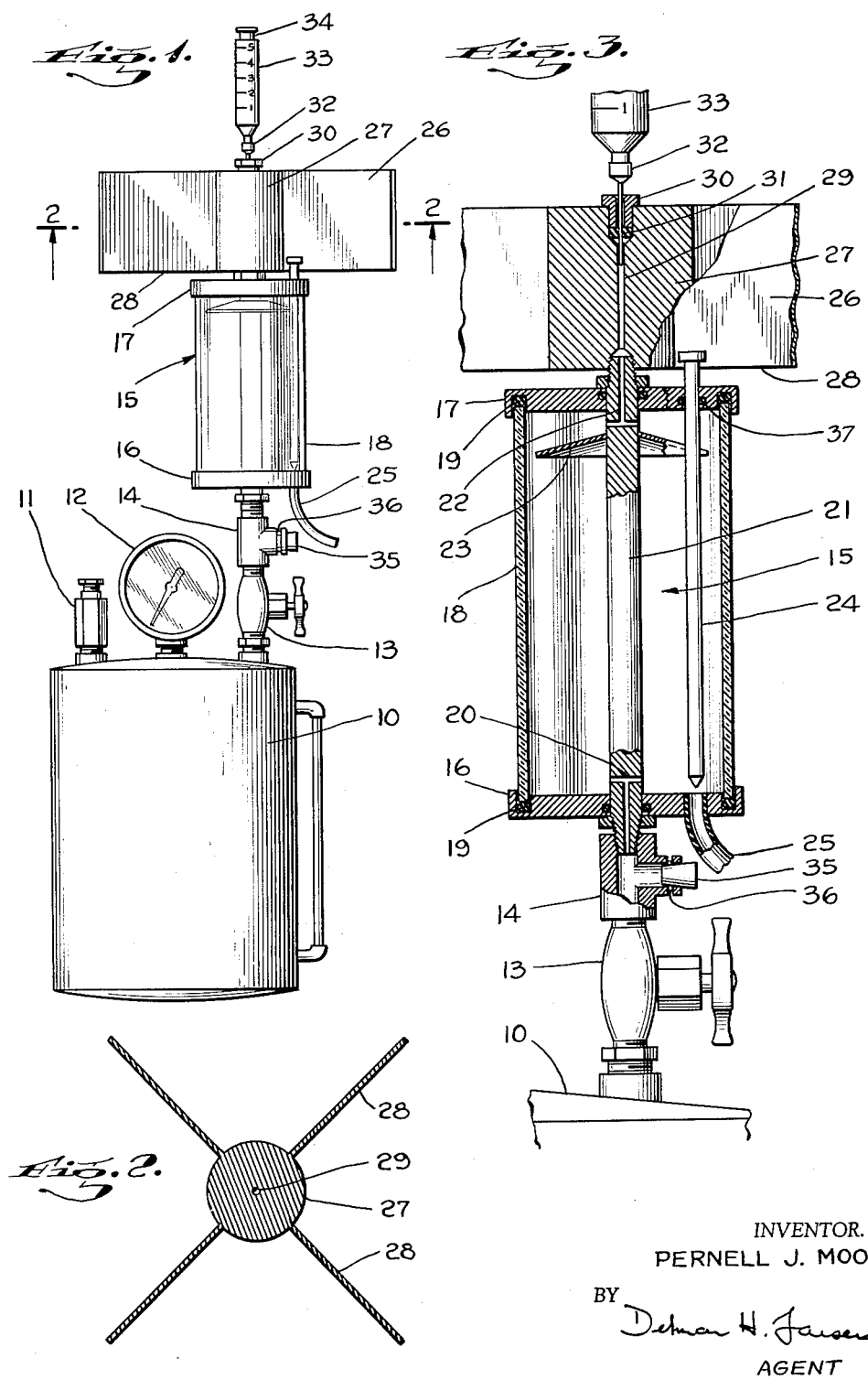
INVENTOR.
PERNELL J. MOORE
BY Delman H. Jansen
AGENT United States Patent Office 3,050,449
Patented Aug. 21, 1962

3,050,449
HYDROCARBON SAMPLING
Pernell J. Moore, Houston, Tex., assignor to National Lead Company, New York, N.Y., a corporation of New Jersey
Filed June 3, 1959, Ser. No. 817,828
3 Claims. (Cl. 202—152)

This invention relates to novel apparatus and process for sampling hydrocarbons, and more particularly for obtaining a sample of relatively volatile hydrocarbons from drilling mud for analytic purposes.

In drilling wells in search of oil and gas by the rotary method, a drilling fluid or mud is circulated during the course of drilling, and brings to the surface a continuous aliquot of the formations traversed. Likewise, during the course of cable tool drilling, from time to time a slurry comprising cuttings dissolved by the bit together with added water or other drilling debris is brought to the surface. In both types of drilling, accordingly, it is possible to carry out analyses on the drilling mud or bailings for hydocarbons, the presence or absence of which can be readily related to the depth of origin. This system of testing such drilling fluid or bailings, which will be designated as "drilling mud" for convenience hereafter, is widely and routinely used, and is the subject of much investigation directed to improving the reliability of the analyses which are carried out.

While the overall process of analyzing a drilling mud for hydrocarbons may appear simple, the simplicity is deceptive because the analyses are complicated by the fact that the mud itself contains constituents such as clays and other sedimentary rocks which have adsorptive powers for different hydrocarbons, by the fact that the different hydrocarbons have differing solubilities in the mud fluid, and by the further fact that one is dealing not with a single pure hydrocarbon but with a mixture of hydrocarbons of widely differing relative volatilities. It is known to pass drilling fluid or mud through various gas traps, as these are called in the art, which perform the function of separating gaseous and readily volatilizable hydrocarbons from the mud so that these can be subjected to analysis. Representative traps appear in U.S. Patents 2,341,169 and 2,792,072. Again, heat can be applied to drilling mud, as set forth in Patent No. 2,229,884, or steam may be used as set forth in Patent No. 2,591,737.

In recent years methods of analyzing mixtures of hydrocarbons have been developed and made commercially available which enable a precise differential analysis to be made of the actual hydrocarbon species in a given mixture. Even as recently as a decade ago, the precise analysis of a hydrocarbon mixture represented a forbiddingly complicated analytical feat which could be undertaken only in elaborately equipped laboratories and which involved the expenditure of many man hours of skilled labor per sample. As mentioned, the picture has changed radically in this respect in recent years, largely because of the development of gas chromatography as well as mass spectroscopy, and in particular, the development of instruments for both of these purposes adapted to field use.

The ability to carry out analyses of hydrocarbon mixtures so as to determine with precision the separate constituents thereof has brought about a pressing need for a sampling technique which can provide a sample of the hydrocarbons present in a drilling mud in such a fashion that the relative proportion of the various single constituents are not varied from one sampling to another by random changes in the extraction process. Otherwise stated, with the analytical methods in use in the field in this art, say ten years ago, relatively "rough-and-ready" sampling devices and processes sufficed, because the analytical methods used were relatively unsophisticated. These generally included merely a semi-quantitative determination of methane on the one hand and of hydrocarbons heavier than methane on the other, in a gas sample obtained from a drilling mud. "Oily" hydrocarbons were determined by ultra-violet inspection, the oil droplets fluorescing readily. However, because of the advent of gas chromatography as well as of mass spectroscopy it is now possible in a field installation, and without an undue expenditure either for equipment or of skilled manpower, to carry out analyses of a scope and accuracy previously not thought possible, and in particular, it is possible to carry out highly quantitative analysis of the several individual species of hydrocarbons present in a mixture. It has been found that when such analyses showing individual hydrocarbon concentrations are plotted as a function of depth, exceedingly useful information is obtained for logging purposes generally, and for correlating and productivity-estimating purposes in particular. The situation is accordingly now reversed from what it was in the past, and the weak point in such mud logging is no longer the analytical methods employed in determining the type and concentration of hydrocarbons present, but rather is now the sampling methods employed, which must provide a sample which is truly representative of the hydrocarbons present in the drilling mud before the latter is tampered with.

An object of the present invention is to provide a sampling apparatus and process for extracting hydrocarbons from a drilling mud sample in an unvarying and accurate fashion.

Another object of the invention is to provide such an apparatus and process which is adapted to field use.

Other objects of the invention will become apparent as the description thereof proceeds.

In the drawings,

FIGURE 1 is an elevational view of an illustrative embodiment of my novel apparatus.

FIGURE 2 is a sectional view, taken at the level shown in FIGURE 1, showing a detail of the condenser which forms a part of the apparatus.

FIGURE 3 is a detail elevational view, partly in section, showing details of the mud injection port, mixing chamber, condenser and sample receiver.

Referring now to FIGURE 1, 10 shows a steam boiler of conventional construction, which may take the form of a simple pressure vessel adapted to be placed on an electric hot plate or gas stove, not shown. The boiler is equipped with a pressure release valve 11, a pressure gauge 12, and an outlet valve 13. Downstream from the outlet valve is a T 14 which functions as a mud injection port, and which leads in turn into a mixing chamber 15.

Mixing chamber 15 is conveniently constructed of a pair of metal end plates 16 and 17 which support a glass cylinder 18, gasketing being provided by rubber gaskets 19. Entrance of steam and mud is permitted at the lower portion of the mixing chamber through a system of capillaries 20 in the lower end of central rod 21. Rod 21 is similarly equipped with exit borings or capillaries 22 in the upper portion thereof, and has a splash guard 23 immediately below the exit capillaries 22. The mixing chamber 15 is also provided with an ejection valve 24 of the simple needle type, which normally closes off a mud drain 25. The ejection valve is operated from above, and is sealed by a ring gasket 37. The upper end of support rod 21 is threaded into a block-and-fin type condenser 26, which consists of a central massive block 27 which I prefer to make of brass because of its high heat conductivity, to which there are attached four heat radiating fins 28 which again may be of brass, copper, or aluminum.

The condenser core 27 is penetrated axially by a capillary 29 which communicates directly with capillary 22. The upper end of condenser core 27 contains a short cylindrical recess into which is fitted a packing gland 30, which serves to compress a soft rubber disc 31 which may be penetrated by a hypodermic needle 32, which in turn is fitted to a glass syringe 33 of the common commercial type used for hypodermic injections. Syringe 33 contains a fitted ground glass plunger 34, which again is of the common and well-known type.

The operation of my novel sampling apparatus will now be described.

With the boiler fired up so as to produce steam at a preferred pressure of 5 to 10 pounds per square inch gauge, the main shut-off valve 13 is open, and steam allowed to stream into the mixing chamber 15. Prior to the introduction of a mud sample, the syringe 32 is withdrawn, so that the rubber disc 31 closes off the upper part of capillary 29. Under these conditions, capillary 29 and most of capillaries 22 quickly become filled with water, and since no further condensation of steam takes place in condenser 26, this, together with the cooling fins 28, remains at substantially room temperature. However, there is substantial heat transfer to the circulating outside air through the end plates 16 and 17 and the glass shell 18 of the mixing chamber 15, so that while the sampling apparatus is in its "standby" state as just described, there is a continuous passage of steam upwardly through capillary 29, together with continual condensation within mixing chamber 15, the water resulting from this condensation accumulating as a pool in the bottom thereof. It will be understood that ejection valve 24 is kept closed during this standby period. Since mixing chamber 15 is directly connected to the source of steam during this period, it will be understood that the interior parts thereof are substantially at boiler temperature.

Now the mud injection T 14 contains a rubber stopper 35 which may be made of a solid piece of soft rubber penetrated by a central hole, or may be made by squeezing together a piece of thick walled soft rubber tubing with a wire clamp 36. In either case, a rubber block is formed which is tight against the boiler pressure of 5 to 10 pounds per square inch which exists in the interior of T 14, but which may be readily penetrated by a hypodermic needle. With the apparatus in standby condition as described above, a sample of mud is taken, for example, from the flow line of the drilling well, placed in a hypodermic syringe of the common type but without the metal needle, and the tapered glass end of the syringe is inserted through the rubber block 35, whereupon the sample of mud, which may be conveniently 5 cc. in volume, is forced into the T 14 against the boiler pressure. I have found that in general the steam flow upwardly through T 14 is great enough to carry with it all of the mud sample so injected, while the apparatus is in standby condition as described, with simply normal heat losses in the mixing chamber accounting for the intake of steam therein. However, it is convenient, and I prefer, to insert syringe 33 and needle 32 into the top of capillary 29 through the rubber disc 31 just a few seconds before injecting the mud sample through rubber block 35. As soon as the upper syringe is in place, the steam pressure forces the condensed water in capillary 29 into the syringe, pushing up the plunger 34 as condensed water enters. The mud sample issues through capillaries 20 into the lower part of mixing chamber 15, and more or less immediately becomes raised to the prevailing temperature, which in view of the boiler pressure is about 220° to 235° F. The mud itself is kept from entry into capillaries 22 by splash guard 23, but all of the volatilizable hydrocarbon content of the injected mud sample is subjected to a flash steam distillation in the mixing chamber, and is rapidly swept upward by the inrush of a large volume of steam through the chamber and into the condenser; and promptly appears in the syringe 33 as condensation of steam and the less volatile hydrocarbons takes place in capillary 29. It will be understood, of course, that the hydrocarbons which are in normally gaseous form at room temperature and atmospheric or slightly above atmospheric pressure will appear in the syringe in gaseous form, while those which are normally liquid under the conditions described will appear in liquid form. Within a very short time, for example about one minute after the mud sample is injected, substantially all of these hydrocarbons appear in syringe 33, which then contains a mixture of water (condensed from steam), gaseous hydrocarbons, liquid hydrocarbons, and any air which may have been introduced along with the mud sample. In many cases, it is convenient and desirable to inject say 2 cc. of air with the mud sample of say 5 cc., the air passing through the system helping to sweep the hydrocarbons promptly into the syringe. This added air serves to prevent less volatile hydrocarbons from reaching dew point and condensing within the syringe. This makes for more positive transfer of the sample when it is removed from the syringe for subsequent analysis.

It is worth noting that for each sample run, wherein two to three cc. of condensed water are collected in syringe 33, about 2,000 to 3,000 cc. of steam sweep up through mixing chamber 15, in view of the fact that 1,000 cc. of steam produces approximately 1 cc. of condensate. Thus where a 5 cc. syringe 33 is employed, it is convenient to scale the apparatus so that mixing chamber 15 has a volume of perhaps ¼ to ⅓ liter, so that there is a 6- to 12-fold sweeping out of the mixing chamber during each sampling run.

A particular feature of the illustrative embodiment of my invention which has been described and to which attention should be called is the vertical capillary tubulation 29. I have termed this a capillary in the specification and in the claims which follow, because it has a relatively small diameter, conveniently of 1/32" to 1/8", and best, 1/16" diameter. Because of its relatively small dimensions and the high surface tension of water, when steam condenses to water in this capillary tubulation which of course traverses the condenser block 27, it stays there unless released upwardly into the fluid receiving chamber 33. In any case, it does not fall downwards into the mixing chamber 15, because this is prevented by its small dimensions. This is accordingly a unique and useful feature, which provides for collection of both liquid condensate and associated gases at the top of the steam distillation chamber, and thus facilitates the separation from the mud solids, which eventually are drained out of the bottom of said chamber.

Another feature meriting attention is the provision of the fluid receiving chamber in the form of a vertical cylinder 33 which is stoppered by a plunger 34 which is essentially retractable. That is, as fluid accumulates in the fluid receiving chamber 33, the plunger 34 goes up accordingly.

As has been mentioned, after a given sample of mud has been introduced into the apparatus as described, within a remarkably short time thereafter, the hydrocarbon constituents thereof appear in the fluid receiving chamber of syringe 33, and further action ceases. The next step in the sampling procedure is to remove the syringe together with the plunger and withdrawing the syringe assembly from the capillary 29 out through the ring seal 31, which act may be termed a recovery of the hydrocarbons which have been expelled from the mud sample. These hydrocarbons are in a particularly convenient form for introduction into any desired type of analytical device, such as a gas chromatographic apparatus, a mass spectrometer, or the like. Because all of the hydrocarbons are contained within the syringe 33, they may be thus transferred to the analytical device without loss. Meanwhile, the sampling apparatus will be in what I have termed herein "standby" condition, the capillary 29 will have filled with condensed steam, the condenser assembly 26 will have cooled down again approximately to room temperature, and the apparatus will be in condition for receiving another mud sample. Several such samplings can be carried out before it is necessary to open ejection valve 24 and discharge the accumulated mud solids from the bottom of the mixing chamber 15. So complete and efficient is the expulsion of the hydrocarbons from each separate mud chamber that there is no carryover of hydrocarbons from one sampling to the next. Of course, if an operator so desires he can clean out the mixing chamber after each steam distillation of a mud sample.

Although my apparatus together with the process by which it is operated is essentially a batch device and process, because of the very short processing time and the ability of the apparatus to clean itself up within a minute or so after each sampling cycle, my apparatus is particularly well adapted to automation, whereby mud samples are intermittently but automatically injected through the mud injection port 35, the fluid receiving chamber 33 is alternately inserted and withdrawn, the contents being expelled after such withdrawal for analysis, and the ejection valve 24 opened momentarily between cycles, all of which can be accomplished by means known in the art involving suitable solenoids operated by a programming device. Since all of these accessories are well-known in the art it is not necessary to elaborate the description and drawings of my invention by setting them forth explicitly. It will be evident that the apparatus can be operated in that fashion and will then become an automatic and substantially continuous device to carry out that intended purpose.

It will further be understood that while I have described a particular embodiment of my invention, many changes are possible within the scope and spirit of my invention, and a broad interpretation is accordingly to be given to the claims which follow.

What I claim is:

1. Apparatus for removing hydrocarbons from drilling mud comprising, in combination: a steam boiler; a mixing chamber having inlet means adjacent to the bottom thereof and outlet means adjacent to the top thereof; conduit means connecting said steam boiler and said inlet means; a fluid injection port in said conduit means; a solid condenser block disposed above said mixing chamber and penetrated throughout its length by a vertical, straight capillary bore at most ⅛ inch in inside diameter; connection means sealably connecting the top of said mixing chamber outlet means and the bottom of said capillary bore; a hypodermic needle having its lower portion within the upper portion of said capillary bore and its upper portion outside of and above said capillary bore; sealing means between said hypodermic needle and the upper portion of said capillary bore; and retractably stoppered syringe means connected to the upper portion of said hypodermic needle.

2. Apparatus for removing hydrocarbons from drilling mud comprising, in combination: a steam boiler; a mixing chamber having inlet means adjacent to the bottom thereof and outlet means adjacent to the top thereof; conduit means connecting said steam boiler and said inlet means; a fluid injection port in said conduit means; a solid condenser block disposed above said mixing chamber and penetrated throughout its length by a vertical, straight capillary bore at most ⅛ inch in inside diameter, and having heat radiating fins attached laterally thereto; connection means providing a conduit from the top of said mixing chamber outlet means to the bottom of said capillary bore; a hypodermic needle having its lower portion within the upper portion of said capillary bore and its upper portion outside of and above said capillary bore; annular sealing means between said hypodermic needle and the upper portion of said capillary bore; and retractably stoppered syringe means connected to the upper portion of said hypodermic needle.

3. Apparatus for removing hydrocarbons from drilling mud comprising, in combination: a steam boiler; a mixing chamber having inlet means adjacent to the bottom thereof, outlet means adjacent to the top thereof, and baffle means above said inlet and below said outlet; conduit means connecting said steam boiler and said inlet means; a fluid injection port in said conduit means; a solid condenser block disposed above said mixing chamber and penetrated throughout its length by a vertical, straight capillary bore at most ⅛ inch in inside diameter and having heat-radiating fins attached laterally thereto; connection means providing a conduit from the top of said mixing chamber outlet means to the bottom of said capillary bore; a hypodermic needle having its lower portion within the upper portion of said capillary bore and its upper portion outside of and above said capillary bore; annular sealing means between said hypodermic needle and the upper portion of said capillary bore; and a retractably stoppered syringe means connected to the upper portion of said hypodermic needle, whereby said stopper is capable of retracting so as to provide space for the reception of fluids entering said syringe means through said hypodermic needle.

References Cited in the file of this patent

UNITED STATES PATENTS

| | | |
|---|---|---|
| 50,935 | Johnston | Nov. 14, 1865 |
| 440,963 | Pinagel | Nov. 18, 1890 |
| 2,361,844 | Horner | Oct. 31, 1944 |
| 2,398,588 | Crawford | Apr. 16, 1946 |
| 2,410,045 | Burk et al. | Oct. 29, 1946 |
| 2,591,737 | Southers | Apr. 8, 1952 |
| 2,658,864 | Ebel | Nov. 10, 1953 |
| 2,723,228 | Moore | Nov. 8, 1955 |
| 2,883,856 | Youngman | Apr. 28, 1959 |